United States Patent [19]

Zimmermann

[11] Patent Number: 5,243,158
[45] Date of Patent: Sep. 7, 1993

[54] FLUID OPERATED PRESSURE SWITCH FOR CONTROLLING A SWITCHING ELEMENT

[75] Inventor: Klaus Zimmermann, Walddorfhaslach, Fed. Rep. of Germany

[73] Assignee: Herion Werke KG, Fed. Rep. of Germany

[21] Appl. No.: 888,521

[22] Filed: May 26, 1992

[30] Foreign Application Priority Data

May 31, 1991 [DE] Fed. Rep. of Germany ... 9106694[U]

[51] Int. Cl.⁵ .............................................. H01H 35/34
[52] U.S. Cl. ..................................... 200/83 J; 73/745; 200/82 C; 200/302.1
[58] Field of Search ................. 200/82 R, 82 C, 83 R, 200/83 S, 83 J, 83 B, 302.1 X; 91/1; 92/5 R; 340/611, 626; 73/717, 723, 745 X; 307/118

[56] References Cited

U.S. PATENT DOCUMENTS

| | | | |
|---|---|---|---|
| 4,630,480 | 12/1989 | Betterton | 200/82 R |
| 4,694,273 | 9/1987 | Franchino | 200/83 J |
| 4,804,808 | 2/1989 | Cero | 200/83 J |
| 4,900,883 | 2/1990 | Brame | 200/83 J |
| 4,967,047 | 10/1990 | Betterton | 200/82 R |
| 5,089,675 | 2/1992 | Betterton | 200/83 J |

FOREIGN PATENT DOCUMENTS

| | | | |
|---|---|---|---|
| 2513313 | 3/1983 | France | 200/83 J |
| 328811 | 5/1930 | United Kingdom | 200/83 J |

*Primary Examiner*—Gerald P. Tolin
*Attorney, Agent, or Firm*—Henry M. Feiereisen

[57] ABSTRACT

A pressure switch for controlling a switching element includes a spring-loaded piston operatively connected to the switching element and acted upon by a pressure fluid. A diaphragm separates the piston from the pressure fluid for providing a leaktight closure of the working parts of the pressure switch from the fluid stream, with a support ring surrounding the piston and being arranged axially between the diaphragm and a bushing by which the piston is guided in an axial direction.

15 Claims, 1 Drawing Sheet

FIG. 1
FIG. 2
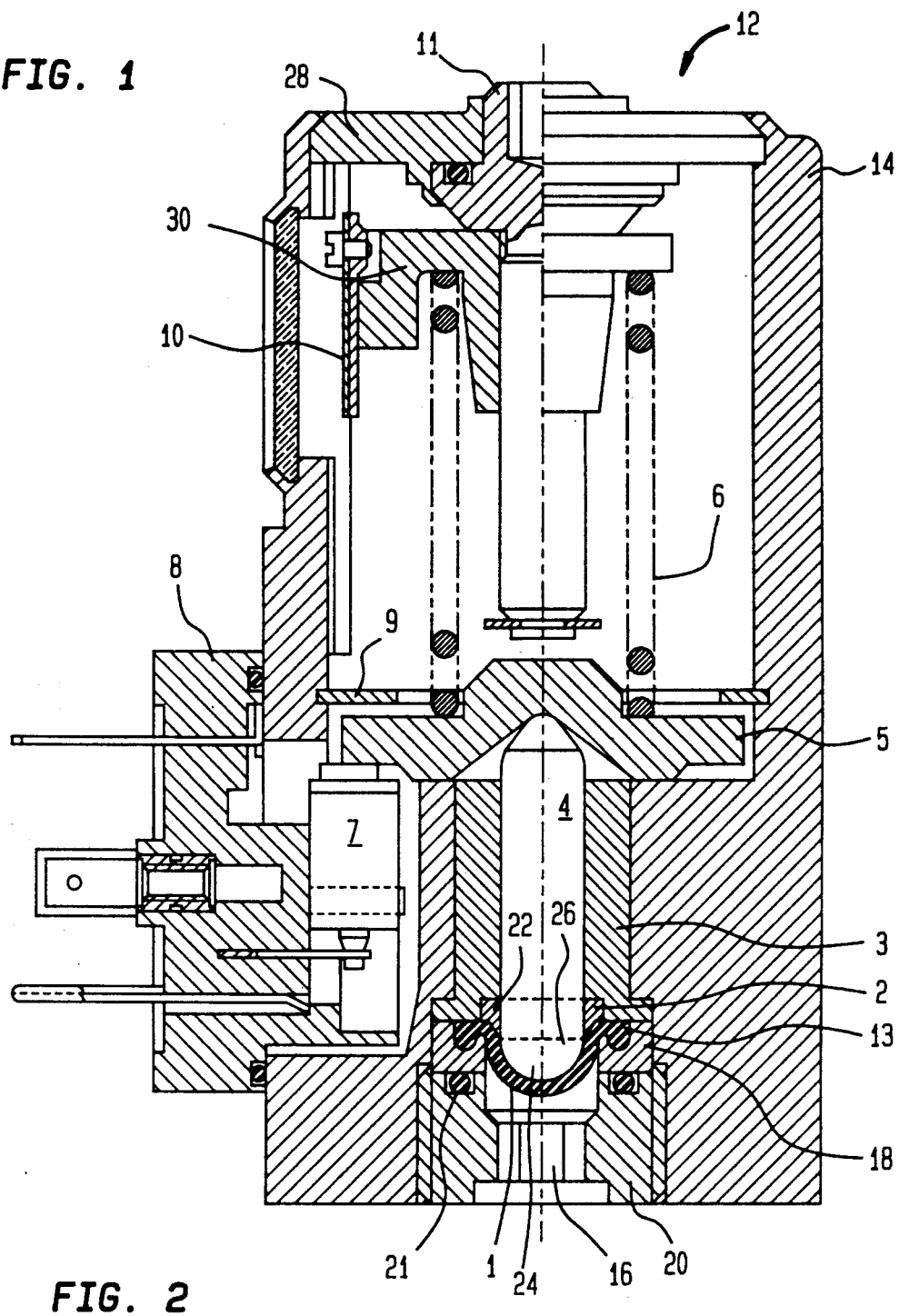
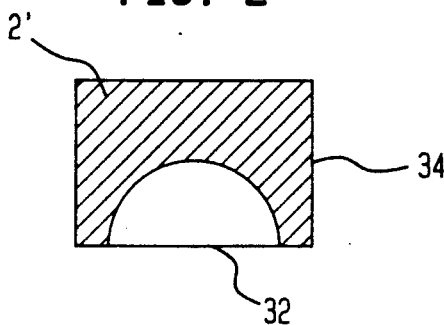

FLUID OPERATED PRESSURE SWITCH FOR CONTROLLING A SWITCHING ELEMENT

BACKGROUND OF THE INVENTION

The present invention refers to a pressure switch, and in particular to a pressure switch for high working pressure.

A conventional pressure switch includes a spring-loaded piston acted upon by a pressure fluid in opposition to the force of the spring for actuating a switching element (e.g. a microswitch) upon reaching a switch point which is preset by the spring. The piston is sealed from the pressure fluid by dynamic sealing elements such as lip seal rings, O-rings or like sealing elements. The use of such dynamic sealing elements is, however, disadvantageous as progressive wear inevitably causes leakage so that fluid will penetrate the interior space of the working parts of the switch. The provision of a drain bore to allow leaky fluid to be discharged into the open is not suitable in connection with pressure switches as this would compromise safety regulations with regard to explosion proofness thereof.

It was thus proposed, at least for pressure switches operating with smaller system pressures of up to about 50 bar, to use diaphragms which are generally made of elastomer material in order to separate the working parts of the pressure switch from the pressure fluid. At higher system pressures, such diaphragms behave almost like highly viscous liquids so that diaphragm material frequently creeps e.g. into the sealing gap between the piston and the piston guide to clog the sealing gap. This results in considerable friction and significant deviations of the switch point. For that reason, the use of pressure switches with diaphragms has been limited to relatively low system pressures.

SUMMARY OF THE INVENTION

It is thus an object of the present invention to provide an improved pressure switch obviating the afore-stated drawbacks.

In particular, it is an object of the present invention to provide an improved pressure switch in which the use of elastomer diaphragms is possible even at higher system pressures.

These objects and others which will become apparent hereinafter are attained in accordance with the present invention by providing a support ring between the elastomer diaphragm and the piston guide, with the support ring surrounding the piston.

Preferably, the support ring is provided at the side facing the diaphragm with an annular projection which may have a cross section of hollow cone-shaped configuration, with its inner surface being of cylindrical configuration and its outer surface tapering towards the diaphragm. Suitably, the cylindrical inner surface of the hollow cone-shaped projection is in alignment with the inner surface of the support ring.

In accordance with a further feature of the present invention, the inner wall of the diaphragm is slantingly recessed inwardly about its upper perimeter for engagement with the projection of the support ring which thus protrudes into the diaphragm in such a manner that the projection is sandwiched between the outer periphery of the piston and an upper section of the inner wall surface of the elastomer diaphragm. Preferably, the support ring may be made of a material of low friction coefficient, especially of bronze or a suitable plastic material best suited for the respective application.

According to a further feature of the present invention, the end face of the piston in opposition to the pressure fluid is of substantial hemispherical configuration, with the diaphragm being of complementary hemispherical configuration so as to envelope this piston end face.

Suitably, the piston includes a cylindrical stem which extends in direction of the diaphragm beyond the support ring by at least the maximum piston stroke. In order to minimize the piston stroke and thus to reduce the stress upon the diaphragm, the switching element is operatively connected to the pressure switch in such a manner as to be displaceable essentially parallel to the direction of movement of the piston.

By incorporating a support ring of this type for backing the diaphragm, forces acting upon the diaphragm by the pressure fluid are distributed to such an extent that diaphragm material is prevented from creeping into gaps between the piston and the support ring. This allows the use of a pressure switch in accordance to the invention for high system pressures, for example of 350 bar while still retaining the advantages afforded by the utilization of diaphragms, especially in connection with the leaktight closure, for a great number of switching operations, e.g. of above $10^7$.

BRIEF DESCRIPTION OF THE DRAWING

The above and other objects, features and advantages of the present invention will now be described in more detail with reference to the accompanying drawing in which:

FIG. 1 is a sectional view of one embodiment of a pressure switch in accordance with the present invention; and FIG. 2 is a sectional view of a modified support ring for use with a pressure switch in accordance with the invention.

DETAILED DESCRIPTION OF PREFERRED EMBODIMENTS

Referring now to the drawing and in particular to FIG. 1, there is shown a sectional view of one embodiment of a pressure switch according to the invention, generally designated by reference numeral 12. The pressure switch 12 includes a housing 14 which accommodates a piston 4 in form of an elongated stem 26 extending vertically in a lower section of the housing 14 and guided by a cylindrical bushing 3 for displacement in an axial direction. The bushing 3 is of substantial L-shaped configuration and is fixedly secured to the housing 14, with the flanged crosspiece hooking behind a shoulder of the housing 14. Preferably, the bushing 3 is made of a material of low friction coefficient, such as bronze.

The piston 4 is acted upon by pressure fluid entering through inlet 16 at the lower end of the housing 14. In opposition to the inlet 16, the piston 4 is provided with an end face 24 of hemispherical configuration. The piston end face 24 is enveloped by a diaphragm 1 of complementary hemispherical shape. The so-shaped cap-type diaphragm separates the piston 4 and thus the working parts of the pressure switch 12 from the fluid stream through inlet 16. Suitably, the diaphragm 1 is made of elastomer.

The diaphragm 1 is provided with a radially extending annular projection or torus 13 which engages a complementary recess in a retainer ring 18 so as to be clamped between one end face of the bushing 3 and the retainer ring 18 and securely fixed in the housing 14 about its perimeter. The retainer ring 18 is urged in direction of the bushing 3 by a ring nut 20 which is threadably engaged into the housing 14 and accommodates the inlet 16. A suitable O-ring 21 is accommodated at the periphery of the ring nut 20 to provide a leaktight closure between the retainer ring 18 and the ring nut 20.

As shown in FIG. 1, the crosspiece of the L-shaped bushing 3, is radially recessed in the area of the piston 1 so that a space is formed in which a support ring 2 is inserted and sandwiched between the bushing 3 and the diaphragm 1. The support ring 2 surrounds the cylindrical stem 26 of the piston 4 and is preferably provided with an inner diameter which essentially corresponds to the inner diameter of the bushing 3. Preferably, the support ring 2 is made of a metal with low friction coefficient, such as bronze. It may, however, also be made of any suitable plastic material.

At its side facing the diaphragm 1, the support ring 2 is provided in one piece with an axial projection 22 which engages an inwardly slanted annular recess at the periphery of the diaphragm 1. Preferably, the projection 22 is configured in form of a hollow cone, with its inner cylindrical wall surface extending flush with the inner cylindrical wall surface of the support ring 2 so that the inner wall surface of the support ring 2 is continued in axial direction. The outer surface of the projection 22 is conical and tapers in direction of the diaphragm 1.

The projection 22 hooks behind the diaphragm 1 so as to be sandwiched in radial direction between the cylindrical surface of the piston 4 and an inner circumferential surface of the diaphragm 1.

The other piston end face which is distant to the inlet 1 bears upon the underside of a spring plate 5, with its top side supporting one end of a compression spring 6 by which the spring plate 5 is biased and urged in direction of the piston 4. The other end of the spring 6 bears upon an abutment 30 which is adjustable in axial direction by means of a threaded spindle 11 axially extending centrally within the housing 14. The force exerted by the compression spring 6 upon the spring plate 5 is thus adjustable for setting the desired switch point of the pressure switch 12. Suitably, the pressure switch 12 is provided with an appropriate scale 10 to allow accurate selection of the desired prestress of the spring and selection of the desired switch point. At its upper end, the threaded spindle 11 is sealingly supported in a lid 28 which closes the housing 14.

The spring plate 5 bears upon the actuating pin of a switching element 7 (e.g. microswitch) which is switched over when traveling a predetermined stroke. The switching element 7 is fixedly secured to a plug 8, but is shiftable, for example via oblong holes in the pedestal of the plug, parallel to the direction of movement of the piston 4 to such an extent that the piston stroke and the stress upon the diaphragm 1 is minimized.

When the system pressure prevailing at inlet 16 reaches a level exceeding the force exerted by the compression spring 16 upon the spring plate 5, the piston 4 and the spring plate 5 are moved upwardly in opposition to the spring force. Simultaneously with the upward movement of the piston 4, the switching element 7 is shifted which is switched over when travelling a certain predetermined stroke. In order to limit the maximum stroke of the piston 4, a suitable stop ring 9 is provided which is securely fixed in the housing 14 and projects into the path of the spring plate 5.

The provision of the support ring 2 creates a force distribution upon the diaphragm 1 even at high system pressures of for example 350 bar such that the possibility of diaphragm material to creep into the sealing gap between the piston 4 and the support ring 2 is essentially eliminated.

Suitably, the cylindrical stem 26 of the piston 4 projects in direction of the diaphragm 1 beyond the support ring 2 and its projection 22 by a distance corresponding to the maximum piston stroke. Thus, even at maximum piston stroke, the hemispherical end face 24 of the piston 4 will not reach the area of the support ring 2 and its projection 22. In this manner, the diaphragm 1 is subjected to minimum deformation and flexing, resulting also in a minimum friction upon the hemispherical piston end face 24.

The cone angle at the tip of the hollow conical projection 22 may be for example in the range of 15°–45°. It will be understood that this range is made by way of example only and should not be limited thereto. Also, the outer surface of the conical projection 22 may be convexly or concavely arched. Persons skilled in the art will also understand that the piston end face 24 which is acted upon by the pressure fluid may be of different shape than the hemispherical configuration or may be curved at a different angle.

Turning now to FIG. 2, there is shown a variation of the support ring 2 as illustrated in FIG. 1. The support ring 2, of FIG. 2 has a cross section of substantially rectangular configuration and is provided in the end face near the diaphragm 1 with an annular groove 32 which preferably is of semicircular cross section. Thus, a wedge-shaped nose 34 is defined between the annular groove 32 and the cylindrical inner surface of the support ring 2, to essentially attain the same advantages as described in connection with the projection 22.

While the invention has been illustrated and described as embodied in a pressure switch, it is not intended to be limited to the details shown since various modifications and structural changes may be made without departing in any way from the spirit of the present invention.

What is claimed as new and desired to be protected by Letters Patent is set forth in the appended claims:

1. A pressure switch for controlling a switching element, especially for use at high system pressures; comprising:
   piston means operatively connected to the switching element and acted upon by a pressure fluid for actuating the switching element;
   guide member for guiding said piston during displacement thereof and having an axial end;
   spring means exerting a predetermined force upon said piston for presetting a switch point of the switching element;
   diaphragm means separating said piston means from the pressure fluid for providing a leaktight closure from the fluid stream, said diaphragm means having opposing sides, with one side bearing about its circumference upon said axial end of said guide member;
   fastening means arranged at the other side of said diaphragm means for clamping said diaphragm means about its circumference between said axial end of said guide member and said fastening means; and a support ring for backing said diaphragm means, said support ring being received in said guide member and arranged axially between said diaphragm means and said guide member and surrounding said piston means.

2. The pressure switch defined in claim 1 wherein said support ring includes an annular projection sandwiched between said piston means and an inner circumferential surface of said diaphragm means.

3. The pressure switch defined in claim 2 wherein said projection has a cross section of hollow cone-shaped configuration.

4. The pressure switch defined in claim 3 wherein said hollow cone-shaped projection has an inner surface of cylindrical configuration and an outer surface tapering toward said diaphragm means.

5. The pressure switch defined in claim 2 wherein said support ring has an inner surface, said hollow cone-shaped projection has an inner surface in alignment with said inner surface of said support ring.

6. The pressure switch defined in claim 2 wherein said piston means includes a piston having a circumference and said diaphragm means includes a diaphragm having an inner wall surface, said projection of said support ring being arranged between the circumference of said piston and a section of said inner wall surface of said diaphragm.

7. The pressure switch defined in claim 1 wherein said diaphragm means includes a diaphragm of elastomer.

8. The pressure switch defined in claim 1 wherein said piston means includes a piston, with one end being acted upon by the pressure fluid and configured of substantial hemispherical shape, said diaphragm means including a diaphragm bearing upon said one end of said piston and being configured of substantial hemispherical shape.

9. The pressure switch defined in claim 1 wherein said piston means includes a piston having a cylindrical stem which extends in direction of said diaphragm means beyond said support ring by a distance corresponding to the maximal piston stroke.

10. The pressure switch defined in claim 1 wherein said support ring is made of a material of low friction coefficient.

11. The pressure switch defined in claim 10 wherein said support ring is made of bronze.

12. The pressure switch defined in claim 10 wherein said support ring is made of plastic material.

13. The pressure switch defined in claim 1 wherein said piston means includes a piston displaceable in axial direction, with the switching element being displaceable substantially parallel to the direction of displacement of said piston.

14. The pressure switch defined in claim 1 wherein said support ring is of substantial rectangular cross section and has one end face provided with an annular groove in opposition of said diaphragm means.

15. The pressure switch defined in claim 14 wherein said annular groove has a cross section of semicircular configuration.

* * * * *